US010698450B2

(12) United States Patent
Mehandjiysky et al.

(10) Patent No.: US 10,698,450 B2
(45) Date of Patent: Jun. 30, 2020

(54) DETACHABLE DISPLAY MEMBER WITH SUPPORT MEMBER

(71) Applicant: HEWLETT-PACKARD DEVELOPMENT COMPANY, L.P., Houston, TX (US)

(72) Inventors: Dimitre Mehandjiysky, Houston, TX (US); Kevin L Massaro, Houston, TX (US); Stacy L Wolff, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 105 days.

(21) Appl. No.: 14/907,947

(22) PCT Filed: Sep. 27, 2013

(86) PCT No.: PCT/US2013/062238
§ 371 (c)(1),
(2) Date: Jan. 27, 2016

(87) PCT Pub. No.: WO2015/047305
PCT Pub. Date: Apr. 2, 2015

(65) Prior Publication Data
US 2016/0299533 A1  Oct. 13, 2016

(51) Int. Cl.
*G06F 1/16* (2006.01)
*E05D 3/12* (2006.01)
*E05D 7/10* (2006.01)

(52) U.S. Cl.
CPC ............. *G06F 1/1654* (2013.01); *E05D 3/12* (2013.01); *E05D 7/1061* (2013.01); *G06F 1/169* (2013.01);
(Continued)

(58) Field of Classification Search
CPC ....... E05D 3/12; E05D 7/1061; G06F 1/1618; G06F 1/1679; G06F 1/1683; G06F 1/169;
(Continued)

(56) References Cited

U.S. PATENT DOCUMENTS 6,006,243 A * 12/1999 Karidis ................. G06F 1/1616
361/679.27
6,282,082 B1  8/2001 Armitage et al.
(Continued)

FOREIGN PATENT DOCUMENTS

CN          1853150      10/2006
CN          102778956    11/2012
(Continued)

OTHER PUBLICATIONS

"Athena Concept Tablet Has Detachable, Touch Sensitive Keyboard"; 2011; 9 pages.
(Continued)

*Primary Examiner* — Daniel P Wicklund
*Assistant Examiner* — Sagar Shrestha
(74) *Attorney, Agent, or Firm* — Trop Pruner & Hu PC (57) ABSTRACT

A support member may be rotatably coupled to a display member and detachably coupled to a base member. The support member may be positionable to form an angle with the display member.

15 Claims, 6 Drawing Sheets

(52) U.S. Cl.
CPC .......... *G06F 1/1616* (2013.01); *G06F 1/1618* (2013.01); *G06F 1/1669* (2013.01); *G06F 1/1675* (2013.01); *G06F 1/1679* (2013.01); *G06F 1/1683* (2013.01); *G06F 1/1632* (2013.01)

(58) Field of Classification Search
CPC .. G06F 1/1616; G06F 1/16697; G06F 1/1601; G06F 1/1632; G06F 1/1654; G06F 1/1669; G06F 1/1675; G06F 1/1637; H05K 5/0017; H05K 5/0204; H05K 7/14; H05K 5/0234; H05K 13/0015
USPC ............ 361/679.29, 679.28, 679.12, 679.17, 361/679.27
See application file for complete search history.

(56) References Cited

U.S. PATENT DOCUMENTS

| | | | | |
|---|---|---|---|---|
| 6,636,204 B2* | 10/2003 | Santoh | ................. | G06F 1/1616 345/169 |
| 6,882,529 B2* | 4/2005 | Helot | ................. | G06F 1/1616 361/679.08 |
| 7,203,058 B2* | 4/2007 | Hong | ................. | G06F 1/162 248/917 |
| 7,206,196 B2* | 4/2007 | Ghosh | ................. | G06F 1/162 248/917 |
| 7,471,506 B2* | 12/2008 | Yin | ................. | G06F 1/1616 248/917 |
| 7,515,408 B2 | 4/2009 | Bakker et al. | | |
| 7,652,873 B2 | 1/2010 | Lee | | |
| 8,208,245 B2 | 6/2012 | Staats et al. | | |
| 8,687,360 B2* | 4/2014 | Nakada | ................. | G06F 1/1616 312/223.1 |
| 8,913,376 B2* | 12/2014 | Wu | ................. | G06F 1/1626 248/917 |
| 9,137,907 B2* | 9/2015 | Sun | ................. | H05K 5/0017 |
| 9,213,373 B2* | 12/2015 | Lin | ................. | G06F 1/1669 |
| 2003/0223185 A1* | 12/2003 | Doczy | ................. | G06F 1/1626 361/679.11 |
| 2004/0047115 A1* | 3/2004 | Helot | ................. | F16M 11/105 361/679.06 |
| 2004/0150945 A1* | 8/2004 | Mache | ................. | F16M 11/046 361/679.21 |
| 2005/0057516 A1 | 3/2005 | Ghosh et al. | | |
| 2005/0254203 A1* | 11/2005 | Choi | ................. | F16M 11/105 361/679.27 |
| 2006/0133738 A1* | 6/2006 | Marcinkiewicz | .... | H04B 1/3833 385/88 |
| 2007/0076363 A1 | 4/2007 | Liang et al. | | |
| 2007/0230120 A1* | 10/2007 | Hata | ................. | G06F 1/1616 361/690 |
| 2007/0252827 A1* | 11/2007 | Hirota | ................. | G06F 1/162 345/204 |
| 2008/0043417 A1* | 2/2008 | Lee | ................. | G06F 1/1605 361/679.23 |
| 2012/0044155 A1 | 2/2012 | Nakada | | |
| 2012/0099254 A1* | 4/2012 | Rogers | ................. | G06F 1/1637 361/679.01 |
| 2012/0162889 A1 | 6/2012 | Han et al. | | |
| 2012/0287562 A1 | 11/2012 | Wu | | |
| 2013/0016468 A1 | 1/2013 | Oh | | |
| 2013/0084796 A1* | 4/2013 | Kerr | ................. | G06F 1/1616 455/39 |
| 2013/0128441 A1 | 5/2013 | Lee et al. | | |
| 2013/0181903 A1 | 7/2013 | Hsu et al. | | |
| 2013/0285475 A1* | 10/2013 | Mai | ................. | G06F 1/1616 307/147 |
| 2014/0153176 A1* | 6/2014 | Ashcraft | ................. | G06F 1/1656 361/679.21 |
| 2014/0340829 A1* | 11/2014 | Matsumoto | ........... | G06F 1/1616 361/679.27 |
| 2015/0378399 A1* | 12/2015 | Grinstead | ............ | G06F 1/1681 361/679.09 |

FOREIGN PATENT DOCUMENTS

| | | |
|---|---|---|
| TW | M452281 | 5/2013 |
| TW | M458045 | 7/2013 |

OTHER PUBLICATIONS

ACER Inc. 2013. Aspire R7. The notebook designed for touch. http://www.acer.com/aspirer7/en_US/.

Case, L.; "Why Windows 8 hybrids won't survive the test of history"; Sep. 10, 2012; 17 pages.

* cited by examiner

DETACHABLE DISPLAY MEMBER WITH SUPPORT MEMBER

BACKGROUND

Some personal computers have been designed for portability. A laptop device may be a portable personal computer with two pieces, such as a display component and a keyboard component, connected to fold together, such as a clamshell form factor. A tablet device may be a one-piece mobile computer. For example, a tablet device may have a touch screen display component to enable it with a user, such as using a finger or a stylus. A user may choose among devices depending on the form factor. For example, a laptop device may be preferable for creating content and a tablet device may be preferable for consuming content.

DETAILED DESCRIPTION

In the following description and figures, some example implementations of apparatus and/or systems having a detachable display member rotatably coupled to a support member are described. As discussed above, a computing device may be selected by a user based on form factor type. Form factors continue to evolve based on the desires of the user and ergonomics. A computing device format that is configurable to act and/or operate like several form factors may be beneficial for ergonomic and productivity purposes to a user whose content desires change.

Various examples described below relate to a detachable display member rotatably coupled to a support member. By rotatably coupling a support member to a display member and designing the support member to be detachable from a base member, display orientation may be accomplished in various situations and several form factors may be accomplished in a single apparatus and/or system.

Figure 1:
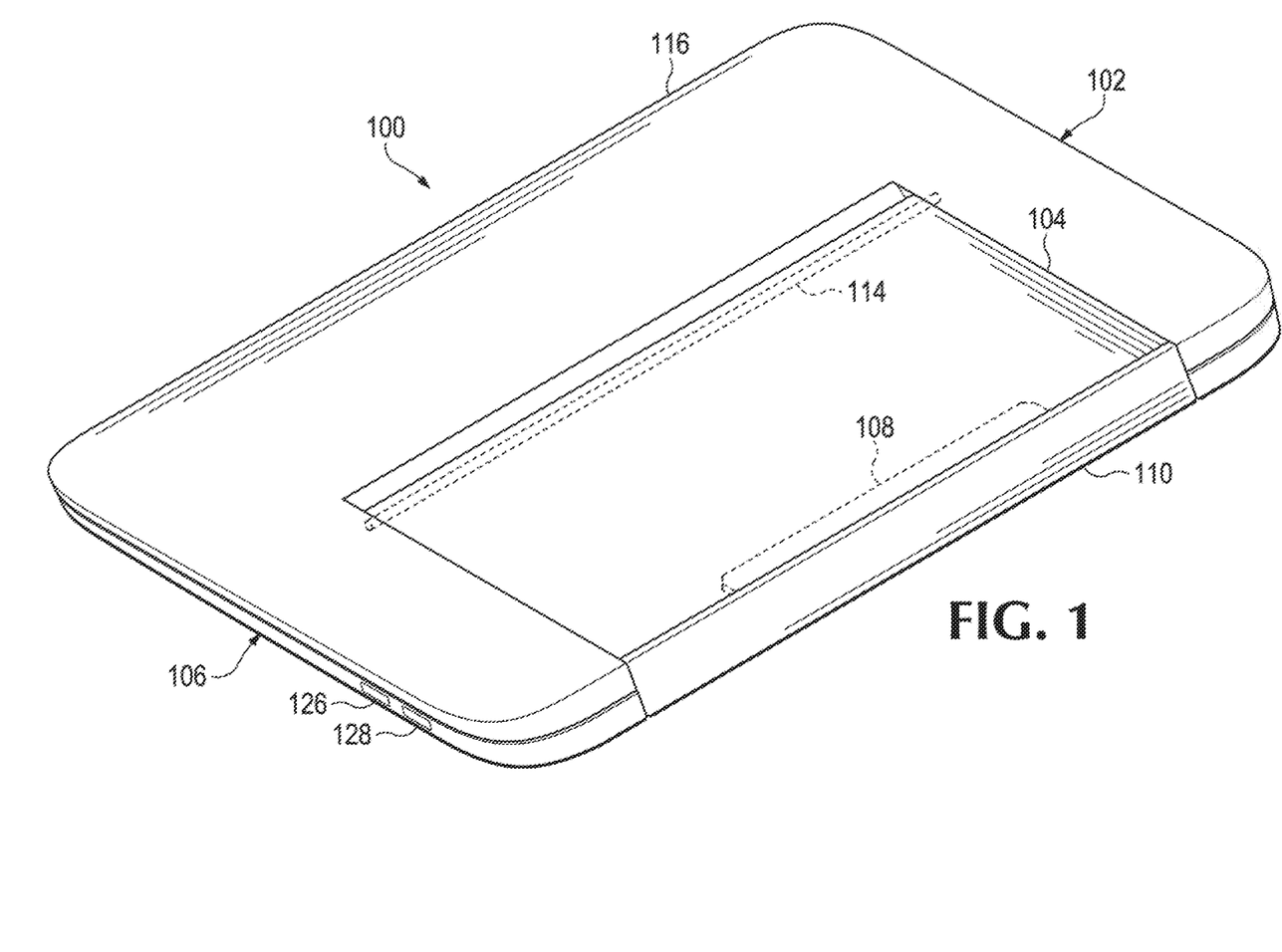
FIG. 1 is a perspective view depicting example apparatus in an example closed configuration.

FIG. 1 is a perspective view depicting example apparatus 100 in an example closed configuration. The example apparatus 100 may generally comprise a display member 102, a support member 104, and a base member 106. The terms "including" and "having," and variations thereof, as used herein have the same meaning as the term "comprising."

Referring to FIG. 1, the display member 102, the support member 104, and the base member 106 may each be positioned or otherwise configured in a closed configuration. A closed configuration may include an arrangement of elements where the display member 102 is positioned onto the base member 106 and an area of the display member 102 providing a view of a screen of the display member 102 is oriented towards the base member 106. For example, the display member 102 may be folded, or closed, onto the base member 106. The closed configuration may be preferable for transporting the example apparatus 100.

Figure 3:
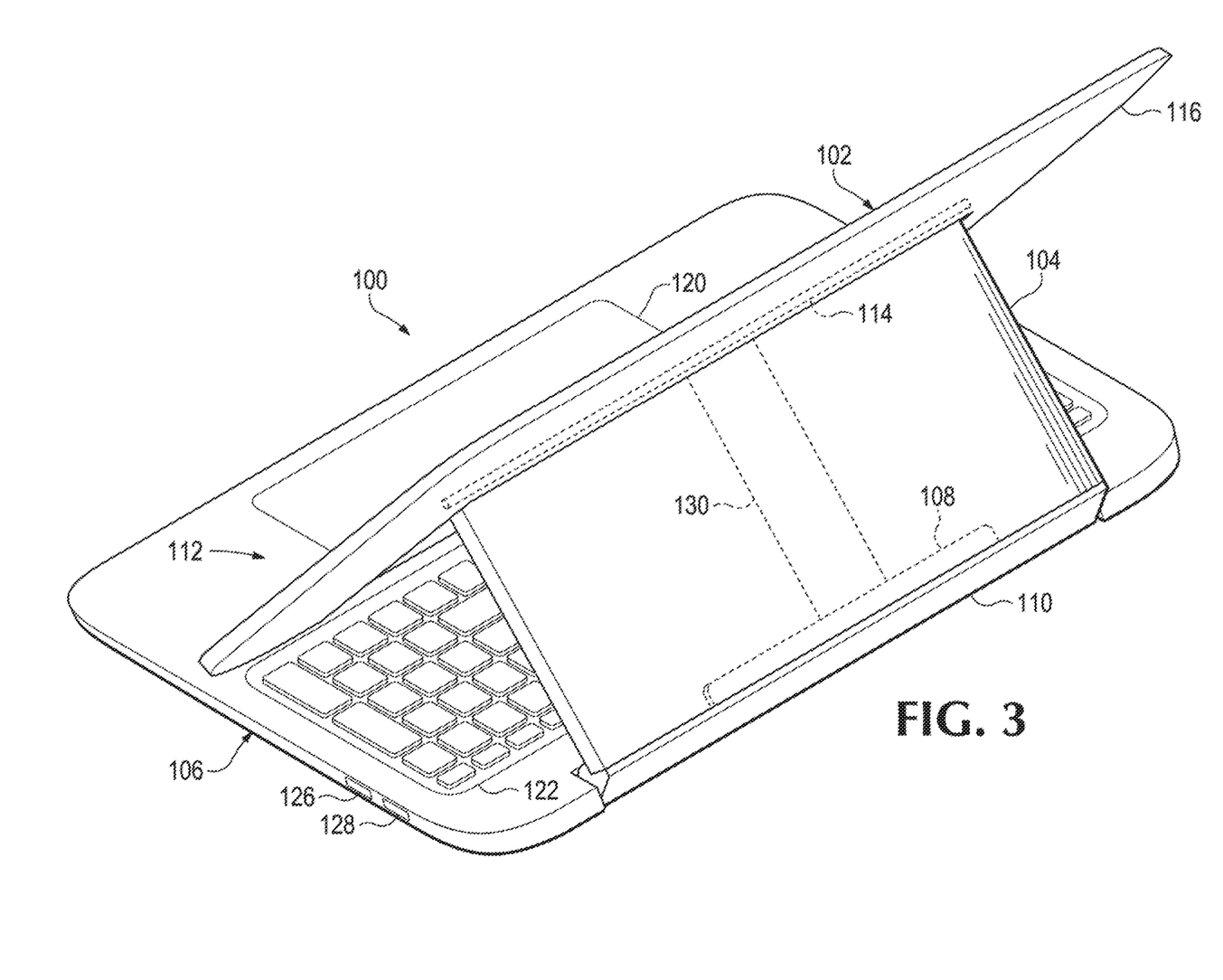
FIG. 3 is a perspective view depicting example apparatus in an example convertible configuration.
Figure 4:
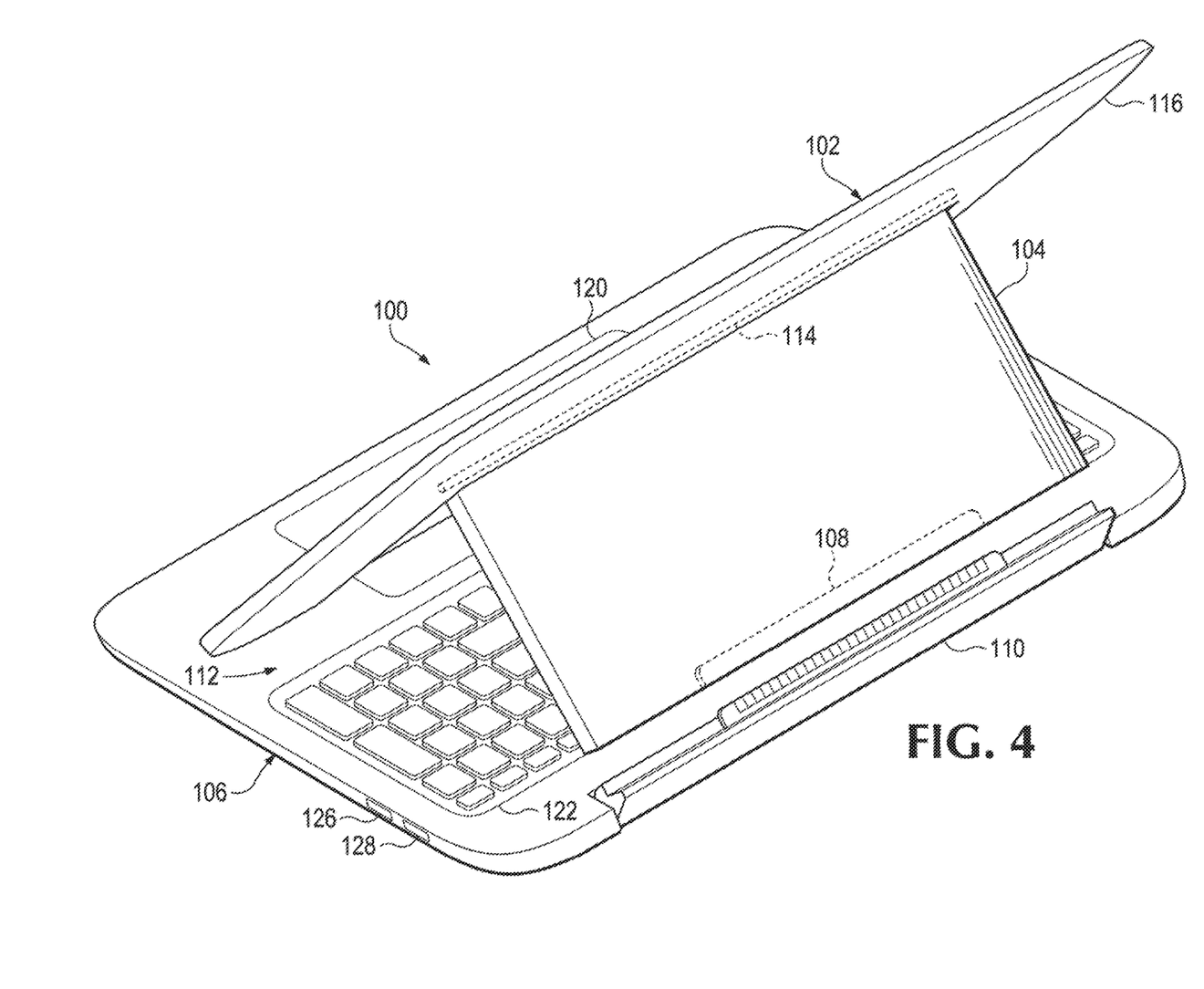
FIG. 4 is a perspective view depicting example apparatus in an example detach configuration with a support member extended.

The base member 106 may include an interface member 108 and a hinge 110. The interface member 108 may provide a point of connection between the support member 104 and the base member 106. The interface member 108 is described in more detail in the description associated with FIGS. 2, 3, and 7. The base member 106 may be detachably coupled to the support member 104 as depicted in FIG. 4 and discussed in more detail in the associated description. For example, the support member 104 may be detachably coupled to the base member 106 at the interface member 108. The hinge 110 may allow for the support member 104 and the display member 102 to rotate in reference to the base member 106. For example, the hinge 110 may allow the orientation, or position, of the support member 104 and/or the display member 102 to rotate from a closed configuration, as shown in FIG. 1, to a laptop may protrude or otherwise extend from the base member 106. For example, the hinge 110 may be raised to allow the display member 102 to lay substantially parallel on the base member 106. The hinge 110 is discussed in more detail in the description associated with FIGS. 2, 3, 6, and 7.

The base member 106 may be substantially rectangular. The base member 106 may be made of metal, plastic, fiber resin, or the like. The base member 106 may include an input device, such as the input device 112 shown in FIG. 2. The input device 112 is discussed in more detail in the description associated with FIGS. 2, 4, 6, and 7. The base member 106 may include a friction increasing component, such as a foot pad, for placing the base member 106 on a surface, such as a desk or table.

The display member 102 may be rotatably coupled to the support member 104 at a second hinge 114. For example, the display member 102 may be rotatably coupled, or coupled in manner to allow rotation, to the support member 104 to allow the display member 102 to be positionable to form an angle with the support member 104 as depicted in FIG. 3 and discussed in more detail in the description associated with FIG. 3. The display member 102 may be positionable to form a second angle with the support member 104 based on a second rotational position of the second hinge 114. Coupling a support member 104 to the display member 102 may allow for the display member 102 to be oriented according to the desires of the user. By providing a supporting mechanism when the display member 102 is detached from the base member 106, a user is not limited to laying the display member 102 substantially flat on a surface of holding, or otherwise manually supporting, the display member 102 to position the display member 102 at an angle. By providing a supporting mechanism when the display member 102 is attached to the base member 106, the display member 102 may be placed towards the user over the base member 106 and the user may angle the display member 102 to adjust for the environment, such as lighting conditions.

The display member 102 may enclose, or include, a display, or a screen, for presenting information in visual or tactile form. For example, the display/screen may be an electronic visual display capable of presenting output from an instruction executed on as processor resource. More specifically, the screen may be liquid crystal display ("LCD"), a light-emitting diode display ("LED"), an electronic paper display, or the like. The screen may be substantially rectangular.

The display member 102 may include a housing 116. The housing 116 of the display member 102 may be designed to lay in a substantially flat or otherwise compact orientation with the base 106 when in a closed configuration. For example, the housing 116 may fold onto the base member 106 in the style of a clamshell form factor where the housing 116 and the base member 106 make contact in a complementary manner.

Figure 2:
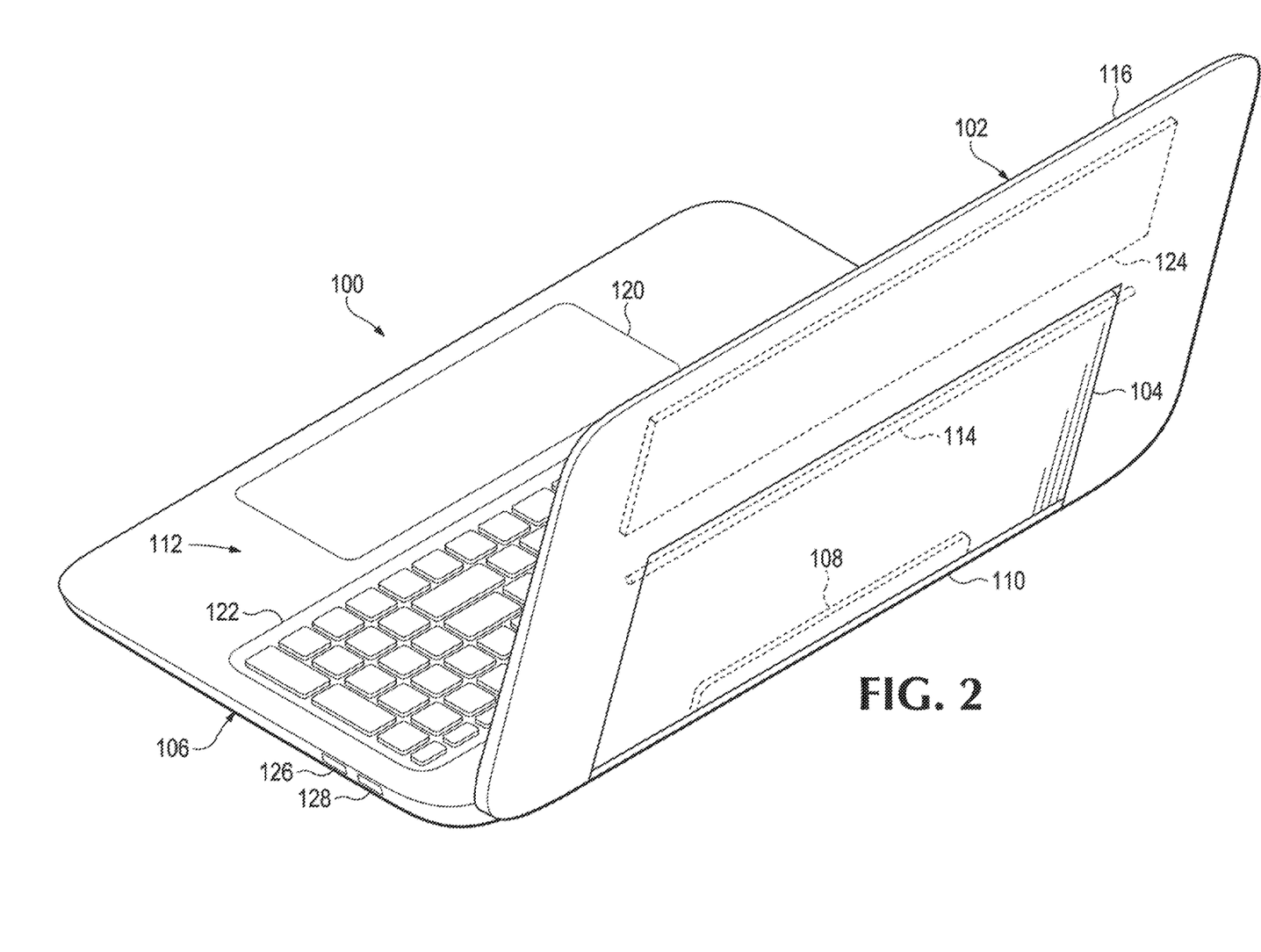
FIG. 2 is a perspective view depicting example apparatus in an example laptop configuration.

FIG. 2 is a perspective view depicting example apparatus 100 in an example laptop configuration. The laptop configuration may be preferable for content creation because the input device 112 may be exposed. For example, a user may place the example apparatus 100 into a laptop configuration to input a line of text using the input device 112.

Referring to FIG. 2, the support member 104 may be positionable, or capable of being positioned, to form an angle with the base member 106 based on a rotational position of a first hinge 110. For example, the support member 104, starting from a closed position, may be positioned at a right angle with the base member 106 based on a 90 degree rotation of the hinge 110. A rotational position may be the position of the hinge based on the rotatability of the hinge with respect to an axis. The rotational position may be described using an angle or a change of position of a member extending from the hinge from a first position to a second position. The hinge 110 may allow for the support member 104 to rotate to form an obtuse angle with the base member 106, an acute angle with the base member 106, or any appropriate number of angles with the base member 106. For example, the hinge 110 may allow the support member 104 to be positioned in a range of angles from the base member 106 from 0 degrees to 360 degrees.

The display member 102 may be rotatably coupled to the support member 104 at a second hinge 114. For example, the display member 102 may be changeable from a substantially parallel position where the display member 102 is substantially parallel to the support member 104, as depicted in FIG. 2, to art angled position where the display member 102 is angled or otherwise not parallel to the support 104, as depicted in FIG. 3. The display member 102 may be positionable to form an angle with the support member 104 based on a rotational position of the hinge 114. For example, the display member 102 may change from a substantially parallel position to an angled position based on the degree of rotation of the hinge 114 from the parallel position. The hinge 114 may be described in more detail in the description associated with FIG. 3-7.

The support member 104 may sustain the display member 102. For example, the support member 104 may be made of any appropriate material to sustain the weight of the display member 102, such as metal, plastic, fiber resin, or the like. The support member 104 may be substantially rectangular. The support member 104 may be substantially planar, substantially curved, or as combination thereof. The support member 104 may have a complimentary geometry to the display member 102. For example as discussed in the description associated with FIG. 5, the support member 102 may substantially fit into to recess formed by the display member 102. The support member 104 and/or the display member 102 may include a friction increasing component, such as a foot pad, for placing the support member 104 and/or the display member 102 on a surface, such as a desk or table.

The display member 102 may include a housing 116 that may accommodate a plurality of components. The housing 116 may made of any appropriate material for encasing components for computing. For example, the housing 116 may be made of metal, plastic, fiber resin, or the like. The plurality of components may be enclosed or otherwise coupled to the display member 102 and may include any appropriate component used in computing. For example, the plurality of components may include a screen, a storage medium, and a processor resource. The plurality of components may be used in association with computing purposes. For example, a processor resource may execute instructions to provide output to be visually presented by the display member 102 for viewing by a user.

The plurality of components accommodated by the housing 116 may include a power source 124. For example, the housing 116 of the display member 102 may accommodate a battery. The power source 124 may be coupled to the display member 102 to supply power to other components of the plurality of components. The apparatus 100 may be configured to supply power to the base member 106 or other external device, such as a universal serial bus ("USB") drive. For example, the interface member 108 may be electrically conductive and the power source 124 may supply power to the base member 106 via the interface, member 108.

The base member 106 may also contain a power source 128. For example, a base may include a battery and/or a connection to an electrical adapter. The power source 128 may receive power from the power source 124 or supply power to power source 124. For example, the base member 106 may supply power to a battery within the housing 116 of the display member 102 through an electrical adapter connected to the base member 106.

The base member 106 may include, or otherwise be coupled to, an input device 112. The input device 112 may include a device capable of receiving input, such as a computer mouse. The input device 112 may include a number of additional devices. For example, the input device 112 may include a keyboard 122 and a pointing device 120. For another example, a device may be added to the input device 112 as a peripheral at a port 126. The input device 112 may communicate with at least one of the plurality of components. For example, the input device 112 may communicate with a processor resource using a communication medium.

The input device 112 may be capable of receiving input based on movement by a user. For example, the pointing device 120 may include a tactile sensor to translate movement or position of a finger or a stylus and the pointing device 120 may communicate the movement or position to the screen of the display member 102. The input device 112 may be capable of receiving multiple forms of input, such as a cursor position from the pointing device 120 and text input from the keyboard 122.

FIG. 3 is a perspective view depicting example apparatus in an example convertible configuration. Referring to FIG. 3, the support member 104 may be positionable to form an angle with the base member 106 based on the rotational position of a first hinge 110 and the display member 102 may be positionable to form an angle with the support member 104 based on the rotational position of a second hinge 114. A convertible configuration may provide ergonomic benefits. For example, the display member 102 may be moved closer to the user for creating content, providing input on a touch screen display and/or using a keyboard available on the display member 102 at an angle with the base member 106.

The hinges 110 and 114 may be any appropriate type of hinge that may allow for rotation between the elements connected by the hinge in accordance with the description herein. The hinge 114 may allow for the support member 104 to rotate in reference to the display member 102. For example, the hinge 114 may be a piano hinge that allows the support member 104 to lay against the display member 102 by rotating either clockwise or counterclockwise. The hinge 114 may allow for the support member 104 to rotate to form an obtuse angle with the display member 102, an acute angle with the display member 102, or any appropriate number of angles with the display member 102.

The combination of hinges 110 and 114 may allow for adjustability of the configuration of the example apparatus 100 and orientation of the display member 102 for viewing the screen of the display member 102. Each hinge 110 and 114 may provide an axis of rotation and/or point of adjustability for the configuration of the example apparatus 100. For example in FIG. 3, a keyboard 122 and a pointing device 120 may be coupled to the base member 106 and the display member 102 may be positionable to cover the keyboard 122 and expose the pointing device 120 by rotating a first hinge 110 towards the keyboard 122 and rotating a second hinge 114 away from the support member 104. Providing multiple axis of rotation and/or points of adjustability allow for a user to modify the configuration of the example apparatus 100 to adjust according to the environment, personal ergonomics, and/or desires of the user.

The hinges 110 and 114 may be arranged to place the example apparatus 100 into a desired form factor. For example, the display member 102 may be positionable, based on a hinge arrangement, to be in one of a tablet position, a laptop position, a convertible position, and a closed position. The hinge arrangement may be based on a first rotational position of the first hinge 110 and a second rotational position of the second hinge 114. A tablet position ma be a position of the display member 102 where the display member 102 may substantially lay on the base member 106 and the area of the display member 102 for viewing, the screen may be oriented away from the base member 106 or otherwise exposed. A laptop position may be a position that orients the display member 102 substantially parallel to the support member 104 and exposes the screen of the display member 102 for view. A convertible position may be a position that orients the display member 102 at an angle with the support member 104. A closed position may be a position that orients the area of the display member 102 for viewing the screen towards the base member 106.

The support member 104 may be sustained at an angle with the base member 106 through the interface member 108. For example, the interface member 108 may be coupled to a hinge 110 and the interface member 108 may sustain the weight of the support member 104 and the display member 102 as the hinge 110 rotates. The base member 106 may have an interface member 108 capable of sustaining the weight of the display member 102 and the support member 104. For example, the interface member 108 may transfer force, such as three from gravity, to the base member 105 through the interface member 108. The support member 104 may be made of a material of strength sufficient to sustain the combined weight of the display member 102 and the support member 104 at any appropriate configurable angle with the base member 106. The hinge 114 may rotate as the support member 104 changes position, and/or vice versa. For example, the hinge 114 may prop the display member 102 at a 45 degree angle with the base member 106 as the hinge 110 rotates the support member 104 from a laptop configuration, as shown in FIG. 2, to a convertible configuration, as shown in FIG. 3. The weight of the display member 102 may include the plurality of components and/or any other appropriate item accommodated within the housing 116 of the display member 102 or attached to the display member 102. For example, the hinge 114 may sustain the housing 116 of the display member 102, a plurality of components within the housing 116, and a USB drive attached to the display member 102.

The support 104 may be coupled to the housing 116 of the display member 102 by a hinge 114 that may be a torque hinge. A torque hinge may be a hinge that sustains the rotation of the hinge by providing a force to maintain the position and/or configuration of the hinge. For example, a torque hinge may be a constant torque position control hinge that provides constant force in multiple rotational directions sufficient to sustain the position of the hinge once the hinge is controlled to that position. The hinge 114 may be a torque hinge that may sustain the display member 102 at an angle with the support member 104. For example, the torque hinge may include dual three springs or robotic arms that may provide torque force against each other in order to sustain the position of the display member 102 at an angle with the support member 104. The hinge 114 may be sufficient to prop the display member 102 without having any other appropriate portion of the display member 102 being supported by the base member 106 or another surface or object. For example, the hinge 114 may be a torque hinge that may hold up the display member 102 in a position substantially parallel to the base member 106 similar to a table on a single support. The hinge 114 may be configured to sustain the weight of the display member 102 at any appropriate angle of the display member 102 with reference to the ground. For example, the hinge 114 may be a torque hinge that may prop the display member 102 at an angle with the support member 104 where the weight of the display member 102 may not be centered on or over the hinge 114.

The hinges 114 and 110 may be responsive to a user placing three on the display member 102 to position the display member 102. In response to the force placed on the display member 102 by the user, the hinges 114 and 110 may move or otherwise change rotational position, configuration, and/or arrangement until the three is released; the hinges 114 and 110 may then sustain the display member 102 in the position substantially at the time the force of the user is released.

The support member 104 may form a channel 130. The channel 130 may contain a communication medium between the base member 106 and the at least one of the plurality of components. For example, the communication medium may be an electrical connection between the input device 112 of the base member 106 and the processor resource of the plurality of components within the housing 116.

An interface member 108 may be coupled to hinge 110. The interface member 108 may connect the channel 130 and/or the communication medium of the support member 104 to the base member 106. The interface member 108 may be any appropriate method of connection. For example, the support member 104 may have a male connector and the interface member 108 may have a female connector configured to receive the male connector. Accordingly, the interface member 108 may be distributed among elements. For example, a first portion of the interface member 108 may be coupled to the support member 104 and a second portion of the interface member 108 may be coupled to the base member 106. The interface member 108 may assist registration of the support member 104 with the base member 106. For example, the interface member 108 may include a guide, a magnet, or otherwise designed to facilitate a connection between the support member 104 and the base member 106. For another example, the interface member 108 may include a hook member that is magnetically attracted to a magnet of the support member 104 such that, when the support member 104 is placed in and/or near the interface member 108, the hook member changes position. The interface member 108 may include a locking and/or unlocking mechanism to assist registration. For example, a hook member may be positionable to connect the support member 104 to the base member 106 and positionable by a force of a locking mechanism to disconnect the support member 104 from the base member 106. The detachability of the support member 104 may be made possible by the design and/or configuration of the interface member 108 and/or the connection between the support member 104 and the base member 106. Detaching the display member 102 where the support member 104 and the base member 106 connect may allow for the support member 104 to be useable with the display member 102 without needing to provide a separate and/or independent device to act as a support mechanism as discussed below in the description associated with FIGS. 4 and 5.

FIG. 4 is a perspective view depicting example apparatus 100 in an example detach configuration with a support member 104 extended. The apparatus 100 may generally comprise a display member 102 and a support 104 detachable from a base member 106. Extending the support member 104 to form an angle with the display member 102 may allow the display member 102 to be positioned at a viewing angle suitable to user without support from the user. The detach configuration with the support member 104 extended may be suitable for consuming content without the base member 106 where a surface is available on which to place the display member 102. The support member 104 may operate as a stand or otherwise support the display member 102 when the display member 102 is detached from the base member 106.

The display member 102 may include a processor resource. The display member 102 may include a housing 116 to accommodate plurality of components. For example, the plurality of components ma include it screen, a storage medium, a power source, and a processor resource. The housing 116 may include an area to view the screen of the display member 102 and/or an area to receive input. The area to view the screen and the area to receive input may be the same area. For example, the display member 102 may include a touch screen area that displays output as well as receives input. The display member 102 may operate as a tablet device when detached from the base member 106. The display member 102 may detach from the base member 106 at the support member 104.

The support member 104 may be rotatably coupled to the display member 102. For example, the support member 104 may be rotatably coupled to a portion of the housing 116 of the display member 102 on a back side of display member 102, where the back side is a side opposite of side including the area for viewing the screen of the display member 102. The support member 104 may be coupled by a hinge 114 at any appropriate position on the display member 102. For example, the support member 104 may be coupled in the middle of back side of the housing 116 or on one of the edges of the housing 116. The support member 104 may be detachable from the base member 106. The support member 104 may be positionable to form an angle with the display member 102. The support member 104 may sustain the display member 102 at an angle with the support member 104 when connected to the base member 106 and/or not connected to the base member 106. For example, a user may detach the support member 104 from the base member 106 and orient the display member 102 with an angle to the ground suitable for viewing the screen of the display member 102. The support member 104 may sustain the angle and weight of the display member 102 on any appropriate surface. The support member 104 may include a friction increasing component, such as a foot pad, to assist sustaining the display member 102 on a surface.

The base member 106 may be able to communicate with at least one of a plurality of components coupled to the display member 102. For example, the base member 106 may communicate with a processor resource of the display member 102. The base member 106 may include an input device 112 capable of communicating with at least one of the plurality of components. For example, the base member 106 may include a keyboard that may communicate with a processor resource contained within the housing 116 of the display member 102. The base member 106 may be able to communicate with the one of the plurality of components wirelessly, such as over a wireless personal area network.

Figure 5:
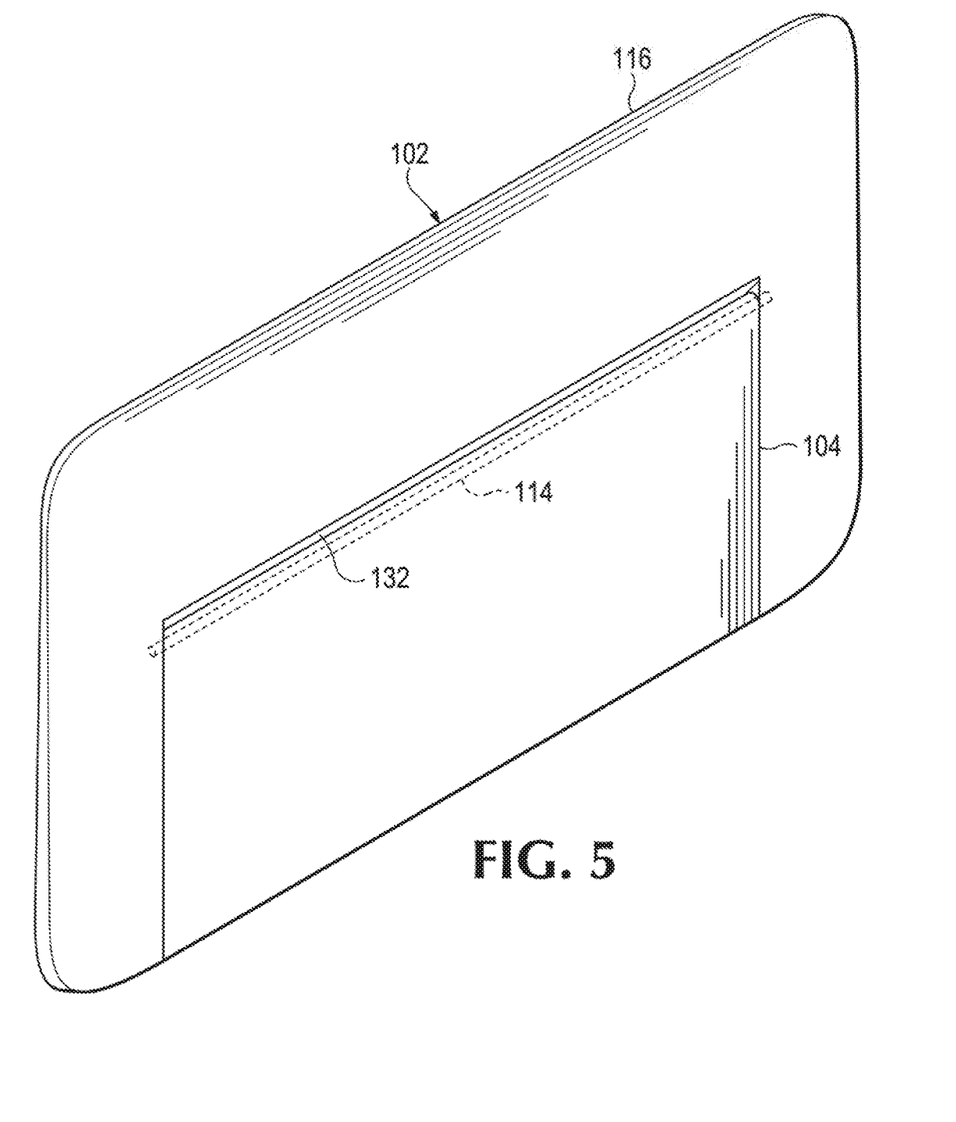
FIG. 5 is a perspective it depicting example display members in an example detach configuration with the support member retracted.

FIG. 5 is a perspective view depicting example display members 102 in an example detach configuration with the support member 104 retracted. The apparatus 100 may generally comprise a display member 102 and a support member 104 detachable from a base member 106. The detach configuration with the support member 104 retracted may be suitable for consuming content without the base member 106 while the user sustains the display member 102 or while the display member 102 is laying substantially flat on an appropriate surface. The display member 102 may operate as a tablet device when detached from the base member 106.

The housing 116 of the display member 102 may form a recess 132 to accommodate a hinge 114. For example, the hinge 114 may be receded into the housing 116 of the display member 102 as depicted in FIG. 5. The recess 132 may accommodate the support member 104. For example, the support member 104 may be positionable within the recess 132, as shown in FIG. 5, based on a rotational position of the hinge 114. The support member 104 may be positional within the recess 132 to lay substantially flat within the recess 132 and/or lay substantially flush with a portion of the housing 116 that does not form the recess 132. The recess 132 may extend substantially across the housing 116 of the display member 102 to allow the support member 104 to change from a first position within the recess 132 to second position within the recess 132. For example, the support member 104 may be coupled to the housing 116 of the display member 102 in the middle of a side of the housing 116 and the support member 104 may positionable within a recess 132 with a first face of the support member 104 in contact with the housing 116 or a second face of the support member 104 in contact with the housing 116 by rotating the hinge 114.

Figures 6, 7:
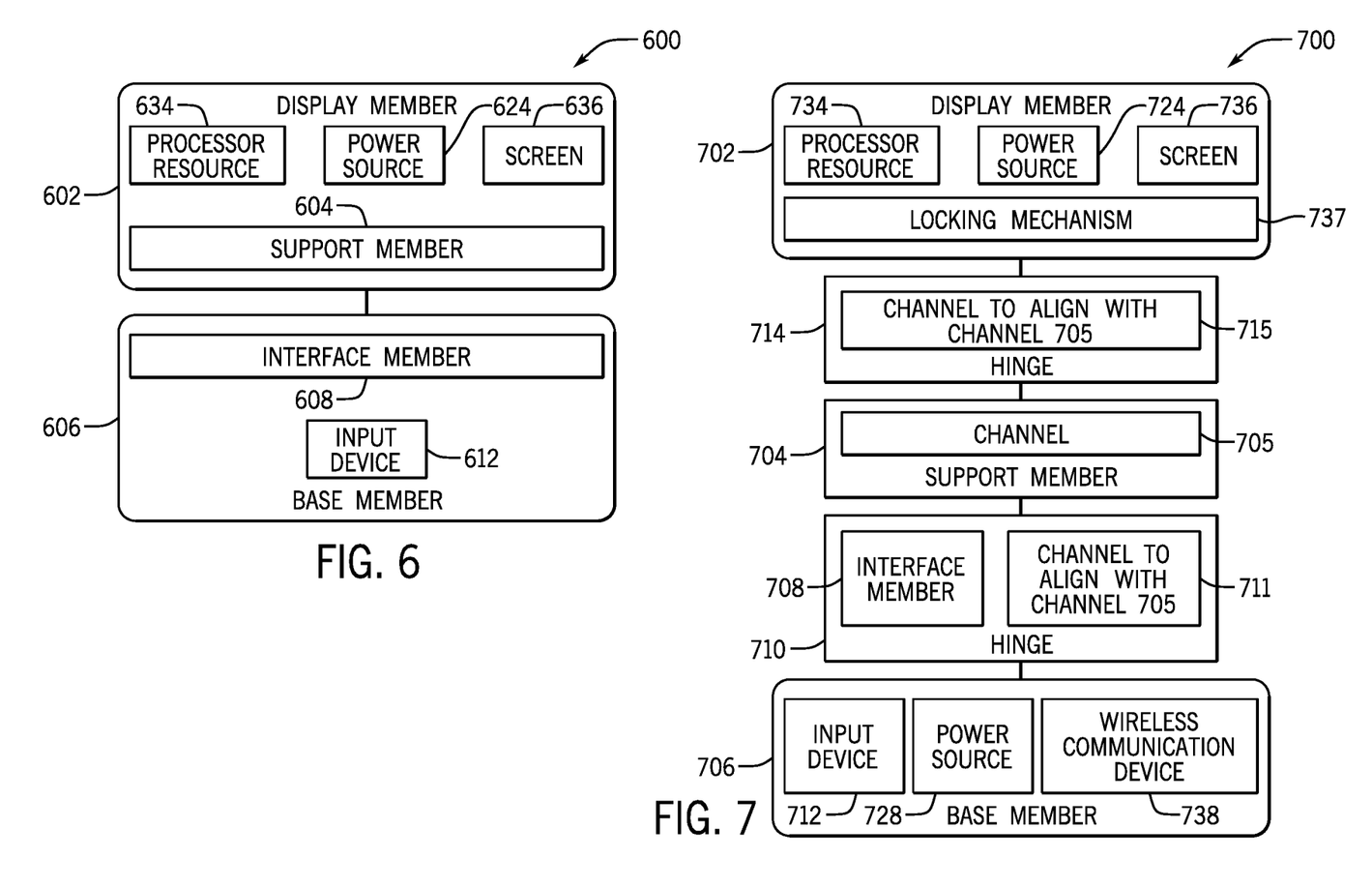
FIGS. 6 and 7 are block diagrams depicting example systems.

The support member 104 may be lockable into a position. A locking mechanism may be coupled to the housing 116 of the display member 102 (for example, FIG. 7 shows a locking mechanism 737 that is part of a display member 702). For example, the support member 104 may be positioned in the recess 132 and may be locked into that position using the locking mechanism 737. The locking mechanism 737 may lock the hinge 114 in a rotational position and/or lock the support member 104 in a position. The support member 104 may be releasable from the locked position using an unlocking mechanism. For example, a button may be located on the side of the housing 116 of the display member 102 that, when pushed, releases the support member 104 from the recess 132 and/or extends the support member 104 to form an angle with the display member 102.

FIGS. 6 and 7 are block diagrams depicting example systems 600 and 700 respectively. The description of example apparatus 100 associated with FIGS. 1-5 may be applied to description of example systems 600 and 700 associated with FIGS. 6-7, and vice versa, as appropriate. For example, the display member 102, described above, may be the same as display member 602, described below, and the description associated with the display member 102 may be applied to the display member 602, and vice versa, as appropriate.

Referring to FIG. 6, the system 600 may generally comprise a display member 602 and a base member 606. The display member 602 may be detachable from the base member 606 at a support member 604. The base member 606 may be configured to communicate with the display member 602. For example, the support member 604 may provide a communication medium between the display member 602 and the base member 606 when the support member 604 is attached to the base member 606. The display member 602 may operate as a tablet device when detached from the base member 606.

The display member 602 may include a plurality of components. The plurality of components may include a screen 636, a processor resource 634, and a power source 624. The display member 602 may include an area to view the screen 636. The display member 602 may present output and provide input to one of the plurality of components, such as the processor resource 634. For example, the display member 602 may include a touch screen display.

The support member 604 may be coupled to the display member 602 and detachable from the base member 606. The support member 604 may be rotatably coupled to the display member 602. The support member 604 may be positionable to form an angle with the display member 102 to sustain a position of the display member 102 when the display member 102 is detached from the base member 606.

The base member 606 may be able to communicate with at least one of the plurality of components. For example, the base member 606 may include an input device 612 that may communicate with a processor resource 634 contained within the display member 602 over a communication medium. The communication medium may be contained within the support member 604 and/or the display member 602. The communication medium may be established upon attaching the support member 604 to the base member 606. The communication medium may allow for the base member 506 to communicate with the display member 602 as well as for the display member 602 to communicate with the base member 606. The communication medium may be electrically conductive and may provide communication as well as supply power between the display member 602 and the base member 606.

The display member 602 may be operable independent of the base member 606. For example, the display member 602 may operate as a tablet device containing components, such as computing resource, to perform computations and execute applications. The base member 606 may be operably dependent on the display member 602. For example, the base member 606 may require a connection between the display member 502 and the base member 606 for the base member 606 to perform functions or otherwise operate. Alternatively, the base member 606 may be operable independent of the display member 602. For example, the base member 606 may have an independent power source, such as power source 728 of FIG. 7, and may be able to transfer input from input device 612 to the display member 602 using a wireless connectivity method, as described further in the description associated with the wireless communication device 738 of FIG. 7.

FIG. 7 is a block diagram depicting example systems 700. References in FIG. 7 of a display member 702, a support member 704, a base 706, an interface member 708, an input device 712, a power source 724, a processor resource 734, and a screen 736 be the same as references in FIG. 6 of the display member 602, the support member 604, the base member 606, the interface member 508, the input, device 612, the power source 624, the processor resource 634, and the screen 636, respectively, and the descriptions associated with FIG. 6 may be applied to FIG. 7, and vice versa, as appropriate.

In reference to FIG. 7, the system 700 may generally comprise a display member 702, a support member 704, and a base member 706. The support member 704 may be rotatably coupled to the display member 702 at a first hinge 714 and may be rotatably coupled to the base member 706 at a second hinge 710. The first hinge 714 may sustain a position of the display member 702 at an angle with the support member 704. The base member 706 may be detachably coupled to the support member 704 at an interface member 708. The support member 704 may be rotatably coupled to the base member 706 at a second hinge 710.

The base member 704 may communicate with the processor resource 734 contained within the display member 702. For example, an input device 712 may be a keyboard coupled to the base member 706 and keystrokes may be sent to the processor resource 734 for execution of a set of instructions associated with the keystrokes. The base member 706 may provide peripheral device capabilities such as input, output, storage, and other capabilities of computer resources.

The support member 704 may form a channel 705. The channel 705 may be used for communication between the display member 702 and the base member 706. The channel 705 may be used for other appropriate purposes for use with computing. For example, the channel 705 may accommodate an electrically conductive connection between the base member 706 and the display member 702 and may provide a communications medium as well as supply power between the base member 706 and the display member 702. The hinges 714 and 710 may generally extend the communications medium to complete the connection between the base member 706 and the display member 702. The hinge 714 may form a second channel 715 to align with the first channel 705 formed by the support member 704. The hinge 710 may form a third channel 711 to align with the first channel 705 formed by the support member 704.

A combination of channels, the interface member 708, and/or connections may provide a communication medium between the display member 702 and the base member 706. The interface member 708 may be electrically conductive and may provide a communication medium between the base member 706 and the support member 704. For example, an input, device 712 may be coupled to the base member 706 and the support member 704 may electrically connect the display member 702 to the base member 706 for an input device 712 to communicate with the processor resource 734.

The base member 706 may include a wireless communication device 738. The base member 706 may communicate input to the display member 702 over a wireless communication method, such as over radio frequency, using the wireless communication device 738. For example, the base member 706 may include a near field communication ("NFC") device that may communicate with a second NFC device located within the display member 702 using a near field communication method. A wireless communication method may allow communication between the base member 706 and the display member 702 without connecting the support member 704 to the base member 706. This may allow for the base member 706 to be detached from the display member 702, yet provide input from the base member 706 to communicate to the display member 702. For example, a user may place the display member 702 on a desk, possibly upright using the support member 704, and communicate with the display member 702 from a distance using the input device 712 on the base member 706.

The base member 706 may include a power source 728. For example, the base member 706 may include a battery and/or a connection to an electrical adapter. The base member 706 may use the power source 728 to at least one of charge the display member 702 and power the display member 702. For example, the base member 706 may operate as a docking station for charging the power source 724 of the display member 702. The base member 706 may include any combination of components to perform operations associated with computing. For example, the base member 706 may comprise at least one of a wireless communication device 738 and a power source 728 and the base may at least one of communicate input to the processor resource 734 over a wireless communication method, charge the battery 724 of the display member 702 using the power source 728, and supply power the display member 702 using the power source 728.

The present description has been shown and described with reference to the foregoing examples. It is understood, however, that other forms, details, and examples may be made without departing from the spirit and scope of the invention that is defined in the following claims.

What is claimed is:

1. An apparatus, comprising
a base member including a first hinge and an interface member attached to the first hinge, the first hinge comprising a first channel;
a support member detachably coupled to the base member at the interface member, the support member positionable to form a first angle with the base member based on a first rotational position of the first hinge, and the support member comprising a second channel to electrically connect with the first channel when the support member is attached to the base member; and
a display member rotatably coupled to the support member at a second hinge, the display member positionable to form a second angle with the support member based on a second rotational position of the second hinge, wherein the display member includes a power source and a processor, the power source to supply power to the base member and the processor to communicate with the base member when the second channel of the support member and the first channel of the first hinge are electrically connected,
wherein the support member is detachable from the first hinge of the base member at the interface member to allow the support member and the display member to, as a unit, be physically separated from the base member such that the first channel and the second channel are disconnected, the support member when detached from the first hinge of the base member providing a stand for the display member operable as a tablet device independently of the base member.

2. The apparatus of claim 1, wherein the base member includes a keyboard and a pointing device, wherein the display member is positionable to cover the keyboard and expose the pointing device.

3. The apparatus of claim 1, wherein the display member is positionable, based on a hinge arrangement, to be in one of a tablet position, a laptop position, a convertible position, and a closed position, the hinge arrangement based on the first rotational position of the first hinge and the second rotational position of the second hinge.

4. The apparatus of claim 1, wherein the base member includes an input device coupled to the base member, wherein the second channel provides a communication medium between the base member and the display member, the input device to communicate with the processor using the communication medium.

5. The apparatus of claim 1, wherein the power source comprises a battery.

6. The apparatus of claim 1, wherein the display member comprises a recess to receive the support member such that the support member is rotatable about the second hinge to position the support member within the recess when the support member is detached from the base member.

7. An apparatus comprising:
a display member, the display member including a processor resource and a power source; and
a support member rotatably coupled to a back side of the display member, wherein the support member forms a first hinged connection with the display member to allow the support member to be positionable with respect to the display member to form an angle with the display member, the support member connectable to a hinge of a base member to form a second hinged connection with the base member, the support member is detachable from the hinge of the base member to allow the support member and the display member to be physically separated from the base member as a unit, and the support member comprising a first channel to electrically connect with a second channel of the hinge of the base member when the support member is connected to the hinge of the base member,
wherein when the support member is connected to the hinge of the base member, the processor resource of the display member is to communicate with the base member via the first channel and the second channel, and the power source is to supply power to the base member via the first channel and the second channel, and
wherein the support member when detached from the hinge of the base member causes disconnection of the first channel from the second channel, and is to provide a stand for the display member operable as a tablet device independently of the base member.

8. The apparatus of claim 7, wherein the support member is coupled to the display member by a further hinge to form the first hinged connection, the further hinge to sustain the display member at the angle with the support member.

9. The apparatus of claim 8, wherein a portion of the display member forms a recess to accommodate the further hinge.

10. The apparatus of claim 9, wherein the display member includes a locking mechanism, wherein the support member is positionable based on a rotational position of the further hinge, and the locking mechanism is to lock the further hinge in the rotational position.

11. The apparatus of claim 9, wherein the recess is positioned relative to the support member such that the support member is configured to rotate about the second hinged connection into the recess.

12. A system comprising:
a display member comprising a processor resource and a power source;
a support member comprising a first channel and rotatably coupled to the display member at a first hinge, the first hinge to sustain a position of the display member at an angle with the support member; and
a base member comprising a second hinge and an interface member connected to the second hinge, wherein the interface member allows the support member to be coupled to the second hinge to rotatably attach the support member to the base member, and the interface member allows the display member and the support member to be decoupled as a unit from the base member to physically separate the unit from the base member, wherein the second hinge of the base member includes a second channel to electrically connect with the first channel when the support member is attached to the base member, and the power source is to supply power to the base member and the processor resource is to communicate with the base member when the first channel and the second channel are electrically connected, and wherein the support member is detachable from the second hinge of the base member to cause disconnection of the first channel from the second channel, and the support member when detached from the second hinge of the base member providing a stand for the display member operable as a tablet device independently of the base member.

13. The system of claim 12, wherein the base member includes an input device, and the support member is to electrically connect the display member to the base member for the input device to communicate with the processor resource.

14. The system of claim 12, wherein the base member further comprises at least one of a wireless communication device and a power source, the base member to at least one of:
communicate input to the processor resource using the wireless communication device;
charge a power source of the display member; or
supply power to the display member.

15. The system of claim 12, wherein the power source comprises a battery.

* * * * *